US012595126B2

(12) United States Patent
Stadie et al.

(10) Patent No.: US 12,595,126 B2
(45) Date of Patent: Apr. 7, 2026

(54) CONTROLLER AND METHOD FOR TRANSPORTING DEVICES

(71) Applicant: Ocado Innovation Limited, Hatfield (GB)

(72) Inventors: Robert Stadie, Hatfield (GB); Andrzej Czarny, Hatfield (GB); Thomas Oliver, Hatfield (GB); Gareth Siret, Hatfield (GB); Christopher Richard James Brett, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 566 days.

(21) Appl. No.: 18/005,471

(22) PCT Filed: Jul. 15, 2021

(86) PCT No.: PCT/EP2021/069780
§ 371 (c)(1),
(2) Date: Jan. 13, 2023

(87) PCT Pub. No.: WO2022/013365
PCT Pub. Date: Jan. 20, 2022

(65) Prior Publication Data
US 2023/0264897 A1 Aug. 24, 2023

(30) Foreign Application Priority Data
Jul. 16, 2020 (GB) ...................................... 2011000

(51) Int. Cl.
*G05D 1/69* (2024.01)
*B65G 1/04* (2006.01)
(Continued)

(52) U.S. Cl.
CPC ......... *B65G 1/1373* (2013.01); *B65G 1/0464* (2013.01); *G05D 1/0289* (2013.01); *G06Q 10/047* (2013.01); *G06Q 10/087* (2013.01)

(58) Field of Classification Search
CPC .... B65G 1/1373; B65G 1/0464; B65G 43/00; B65G 1/04; B65G 43/10; G05D 1/0289;
(Continued)

(56) References Cited

U.S. PATENT DOCUMENTS 6,654,662 B1   11/2003 Hognaland
7,920,962 B2 *   4/2011 D'Andrea ............ G05D 1/0212
701/410
(Continued)

FOREIGN PATENT DOCUMENTS

GB        2570119 A      7/2019
JP     2017518940 A      7/2017
(Continued)

OTHER PUBLICATIONS

Office Action (Examination Report No. 1) issued on Aug. 4, 2023, by the Australian Patent Office in corresponding Australian Patent Application No. 2021308322. (4 pages).
(Continued)

*Primary Examiner* — Justin Holmes
(74) *Attorney, Agent, or Firm* — Gregory Matt McCloskey

(57) ABSTRACT

A controller is provided to control movement of a plurality of transporting devices. In particular, the controller provides improved robot shunting. More specifically, the controller delays the planning of a shunt path for an idle robot until closer to the time the idle robot needs to move out of the way. Advantageously this avoids the computing burden of planning shunts in advance that are never performed because the idle robot is subsequently tasked before the shunt were (Continued)

due to start. In particular, shunt paths can be planned very close to the time at which they need to be executed thereby providing a more efficient solution to robot shunting because very close to the execution time there is a very small probability that the plan will change in a way that the shunt needs to be recalculated.

23 Claims, 12 Drawing Sheets

(51) Int. Cl.

| | |
|---|---|
| *B65G 1/137* | (2006.01) |
| *G05D 1/00* | (2006.01) |
| *G06Q 10/047* | (2023.01) |
| *G06Q 10/087* | (2023.01) |

(58) Field of Classification Search
CPC ............ G05D 1/02; G05D 1/021; G05D 1/69; G05D 1/43; G05D 1/644; G06Q 10/047; G06Q 10/087; Y02P 90/02; G05B 19/4189; G05B 17/02
See application file for complete search history.

(56) References Cited

U.S. PATENT DOCUMENTS

| | | | | |
|---|---|---|---|---|
| 11,841,711 | B2 * | 12/2023 | Stadie | .................. G05D 1/0297 |
| 11,975,744 | B2 * | 5/2024 | Stuhaug | ................. B65G 63/06 |
| 2018/0075402 | A1 | 3/2018 | Stadie et al. | |
| 2019/0152057 | A1 | 5/2019 | Sharp et al. | |
| 2020/0363819 | A1 | 11/2020 | Stadie et al. | |

FOREIGN PATENT DOCUMENTS

| | | | |
|---|---|---|---|
| WO | 317366 | B1 | 10/2004 |
| WO | 2015019055 | A1 | 2/2015 |
| WO | 2015185628 | A2 | 12/2015 |
| WO | 2021008766 | A1 | 1/2021 |
| WO | 2021177135 | A1 | 9/2021 |

OTHER PUBLICATIONS

First Office Action issued on Jan. 9, 2024, by the Japanese Patent Office in corresponding Japanese Patent Application No. 2023-502821, and an English Translation of the Office Action. (9 pages).

International Search Report (PCT/ISA/210) and Written Opinion (PCT/ISA/237) mailed on Oct. 18, 2021, by the European Patent Office as the International Searching Authority for International Application No. PCT/EP2021/069780. (15 pages).

Patents Act 1977: Combined Search and Examination Report under Sections 17 and 18(3) dated Dec. 16, 2021 issued by the United Kingdom Intellectual Property Office in Application No. GB2110177. 9. (8 pages).

Patents Action 1977: Examination Report under Section 18(3) dated Aug. 25, 2022 issued by the United Kingdom Intellectual Property Office in Application No. GB2110177.9. (4 pages).

Patents Action 1977: Search Report under Section 17(5) dated Jan. 8, 2021 issued by the United Kingdom Intellectual Property Office in Application No. GB2011000.3. (3 pages).

Office Action (Communication) issued on Mar. 11, 2024, by the European Patent Office in corresponding European Patent Application No. 21 743 196.4. (8 pages).

Office Action issued on Apr. 30, 2024, by the Canadian Patent Office in corresponding Canadian Patent Application No. 3,188,336. (4 pages).

Office Action issued on Apr. 16, 2025 by the Korean Patent Office in corresponding Korean Application No. 10-2023-7004253 (18 pages) corresponding to Applicant's U.S. Appl. No. 18/005,471.

Office Action issued on Aug. 1, 2025 by the Chinese Patent Office in corresponding Chinese U.S. Appl. No. 18/005,471.0 (18 pages) corresponding to Applicant's U.S. Appl. No. 18/005,471.

* cited by examiner

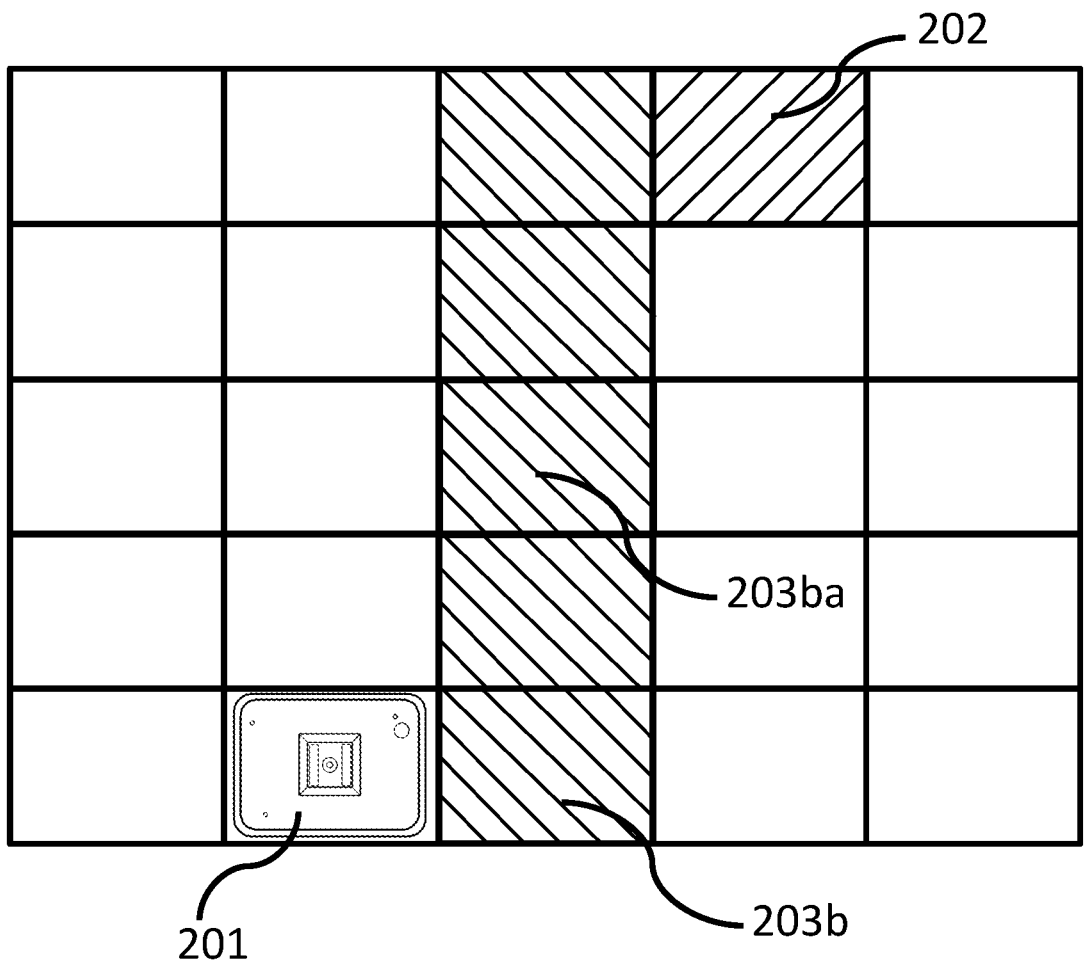
202
203ba
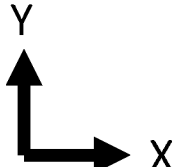
201
203b
Y
X
Figure 3

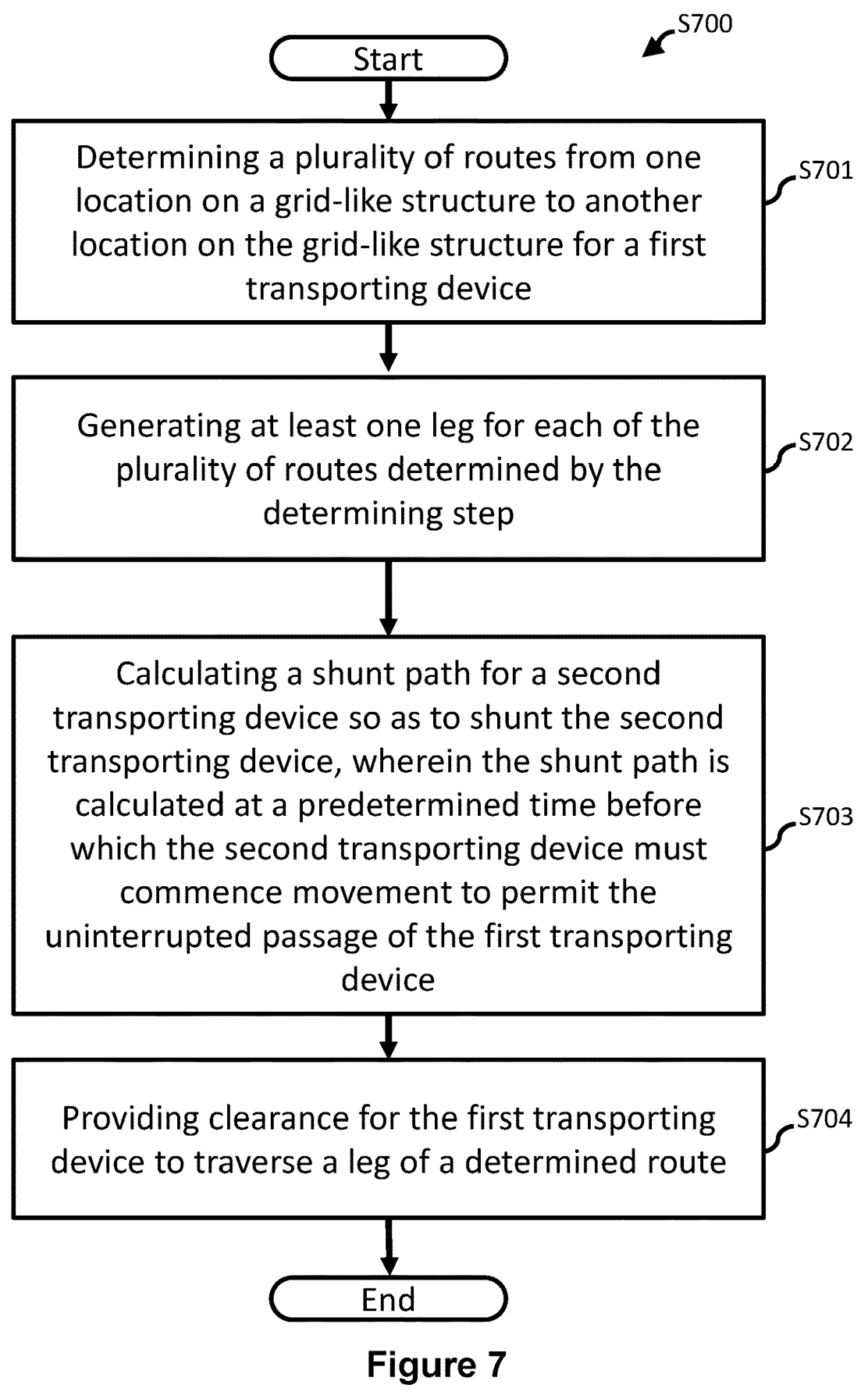

S700

Start

Determining a plurality of routes from one location on a grid-like structure to another location on the grid-like structure for a first transporting device

S701

Generating at least one leg for each of the plurality of routes determined by the determining step

S702

Calculating a shunt path for a second transporting device so as to shunt the second transporting device, wherein the shunt path is calculated at a predetermined time before which the second transporting device must commence movement to permit the uninterrupted passage of the first transporting device

S703

Providing clearance for the first transporting device to traverse a leg of a determined route

S704

End

Figure 7

CONTROLLER AND METHOD FOR TRANSPORTING DEVICES

This application claims priority from UK Patent Application No. GB2011000.3 filed 16 Jul. 2020, the content of all this application hereby being incorporated by reference.

TECHNICAL FIELD

The present invention relates generally to the field of controlling transporting devices. More specifically to an apparatus and method for controlling movement of transporting devices based on the movements of other transporting devices.

BACKGROUND

Certain commercial and industrial activities require systems that enable the storage and retrieval of a large number of different products. One known system for the storage and retrieval of items in multiple product lines involves arranging storage bins or containers on rows of shelves arranged in aisles. Each bin or container holds one or more products of one or more product types. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

For example, online retail businesses selling multiple product lines, such as online grocers and supermarkets, require systems that are able to store tens or even hundreds of thousands of different product lines. The supply chains and warehouse operations of these businesses are highly dependent on their ability to organise, retrieve and return items to various containers.

In particular implementations of various warehouse and storage facility designs, containers may be stacked on top of one another and the stacks may be arranged in rows. The containers may then be accessed from above, removing the need for aisles between the rows and allowing more containers to be stored in a given volume or area.

In WO-A2-2015/185628, which is incorporated herein by reference, the containers are accessed by one or more robotic or automated means, which navigate through a grid of pathways to access containers for a variety of different operations, such as moving a container from one location to another for handling, conducting operations upon a container, returning a container to a position in a warehouse, etc.

There is disclosed that path planning for each robot occurs a predetermined time in the future. Planning further ahead in time provides greater visibility of potential contention for paths of each robot which permits the selection of paths which are more efficient (optimal against a defined cost function). In this regard it may be more efficient to move an idle robot out of the way rather than plan a path around the idle robot, also referred to as 'shunting'. There is disclosed a "shunt search" comprised of finding paths to move robots which are idle now, or will go idle in the path of the robot which is being tasked (hereinafter referred to as the primary robot), to locations where they may continue being idle and not be in the way of the path of the primary robot.

The co-ordination of the movement of the one or more robotic or otherwise automated means may be an important consideration in determining the overall efficiency and scalability of a system for storage and retrieval of a large number of different products.

However, in many situations, shunting robots reduces the efficiency (is less optimal against a defined cost function) because when new paths are added to planned paths for later tasks then there may be more optimal shunt paths for the idle robots.

In some circumstances planning shunt moves in advance may be suboptimal as it may lead to other robots being allocated a path around a future shunt move that is later deemed unnecessary. This can typically occur when the idle robot has been selected for a task and moves before the time of the planned shunt. In such circumstances it may be possible to rebuild the plan to resolve the sub optimality, but this may not be desirable in a real-time system because of the computer processing burden, particularly in systems with many hundreds or thousands of bots.

SUMMARY

In view of the problems in known robot shunting algorithms, the present invention aims to provide an apparatus and method for improved robot shunting.

In general terms, the invention introduces the concept of delaying the planning of a shunt path for an idle robot until closer to the time the idle robot needs to move out of the way. Advantageously this avoids the computing burden of planning shunts in advance that are never performed because the idle robot is subsequently tasked before the shunt were due to start. In particular, the present invention introduces the concept of planning shunt paths very close to the time at which they need to be executed thereby providing a more efficient solution to robot shunting because very close to the execution time there is a very small probability that the plan will change in a way that the shunt needs to be recalculated.

According to the present invention there is provided a controller arranged to control movement of a plurality of transporting devices. The controller comprises a route determination unit arranged to determine a plurality of routes from one location on a grid-like structure to another location on the grid-like structure for a first transporting device and a waypoint generation unit arrange to generate at least one leg for each of the plurality of routes determined by the route determination unit. The controller further comprises a shunt calculation unit arranged to calculate a shunt path for a second transporting device so as to shunt the second transporting device, wherein the shunt path is calculated at a predetermined time before which the second transporting device must commence movement to permit the uninterrupted passage of the first transporting device and a clearance unit arranged to provide clearance for the first transporting device to traverse a leg of a determined route.

Moreover, the present invention further provides a storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces. The storage system further comprises a plurality of stacks of containers located beneath the rails, and arranged such that each stack is located within a footprint of a single grid space. Moreover, the storage system further comprises a plurality of transporting devices each arranged to selectively move in the X and/or Y directions, above the stacks on the rails and arranged to transport a container and a controller according to any preceding claim.

In addition, the present invention further provides a method for controlling movement of a plurality of transporting devices. The method comprising the steps of determining a plurality of routes from one location on a grid-like structure to another location on the grid-like structure for a first transporting device and generating at least one leg for each of the plurality of routes determined by the determining step. The method further comprises calculating a shunt path for a second transporting device so as to shunt the second transporting device, wherein the shunt path is calculated at a predetermined time before which the second transporting device must commence movement to permit the uninterrupted passage of the first transporting device and providing clearance for the first transporting device to traverse a leg of a determined route.

BRIEF DESCRIPTION OF THE DRAWINGS

Embodiments of the invention will now be described by way of example only with reference to the accompanying drawings, in which like reference numbers designate the same or corresponding parts, and in which:

FIG. 3 is a diagram showing a transporting device and a second determined route to a target on the grid.

FIG. 7 is a flowchart of steps performed by a controller according to a first embodiment of the present invention.

DETAILED DESCRIPTION OF EMBODIMENTS

First Embodiment

Figure 1:
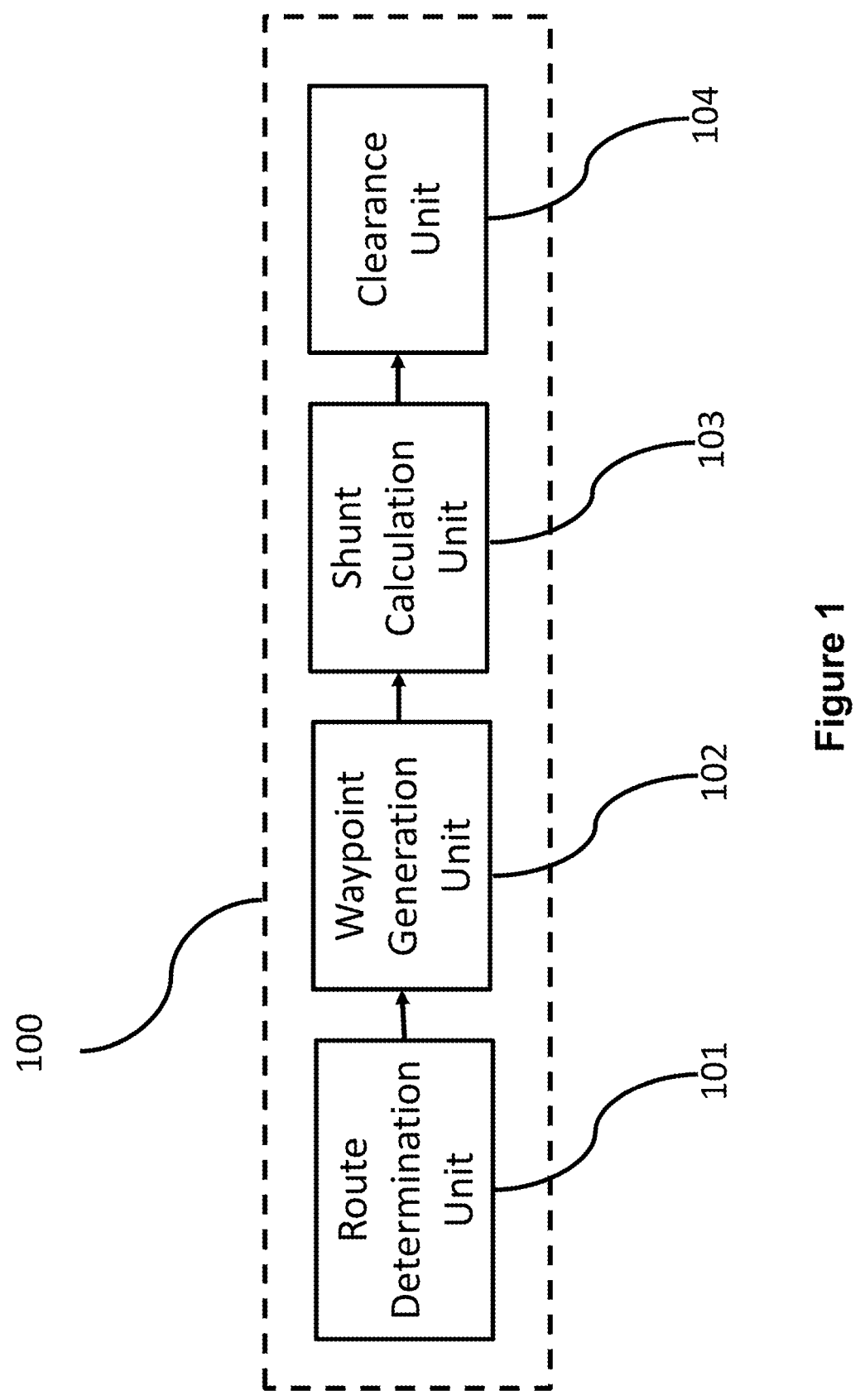
FIG. 1 is a schematic diagram of a controller according to a first embodiment of the present invention.

FIG. 1 depicts a controller according to the first embodiment of the present invention. The controller may be a standalone component.

The controller may be arranged but non-limited to operating in a fully- and semi-automatic goods storage and retrieval systems. Various aspects of which may sometimes be referred to as "order fulfilment," "storage and retrieval," and/or "order picking" systems, can be implemented in a wide variety of types and forms. One manner of providing access to goods stored for fully- and/or semi-automatic retrieval, for example, comprises placement of goods, which may be of any desired type(s), in bins or other containers (hereinafter referred to generically as containers), and stacking and/or otherwise disposing the containers in racking or vertically in layers, such that individual containers may be accessible by wholly or partially-automated container retrieval systems. In some embodiments, the systems may include systems beyond goods storage and retrieval, such as systems where goods are processed, repaired, manipulated, assembled, sorted, etc., and the movement of goods, products, parts, components, subcomponents is required, both within a facility and/or to other facilities or transportation. For the purposes of this specification, a storage facility for the storage, retrieval, processing and/or fulfilment of orders, wherein access to such goods is provided by fully or semi-automatic retrieval, is referred to as a "hive". The "hive" may be comprised of a grid-like layout of the potential pathways for the movement of robotic elements or devices ("robot", "transporting device" or "load handling device") to traverse and perform operations at various locations in the "hive" (referred to as the "grid" or "grid-like structure").

The specification is not limited to only systems that have "hives", "grids", and/or "robots", but systems that broadly control and/or coordinate the movement and/or activities of a plurality of devices may also be contemplated. These devices may be configured for the transportation of various items, such as goods and/or products, and/or containers that may be empty and/or holding such goods and/or products. These devices may further be involved in the fulfilment of orders but may also be involved in any other type of activity, such as transporting containers to and from workstations, moving objects from source locations to target locations, etc.

As indicated, the devices may be robots, and the devices may be configured to move around a hive, and/or communicate with a control system to coordinate/receive instructions on their movement. In some embodiments, the devices may be configured to communicate amongst themselves, and/or coordinate movement amongst themselves. Accordingly, the devices may have various transporting means, communications means, powering means, processing means, processor means, sensor means, monitoring means, on-board workstations, electronic/physical storage means and/or lifting/transporting means (such as a winch, arms, etc.).

While the devices may be configured to receive instructions from the system, there may be situations where the devices lose communications with the system, have degraded communications pathways and/or do not receive communications from the system within a particular time frame. In some embodiments, the devices may also be configured to communicate amongst each other, and/or sense the presence of each other. These communications and/or sensory inputs may be utilized, for example, in crowdsourcing information about the environment, providing redundant communications channels, verifying instructions, etc. Fulfilment of orders may include various operations, such as, but not limited to: assembling orders where various products are purchased and aggregated for delivery to a customer, such as for a grocery chain; assembling products with various subcomponents; conducting various operations on products (such as soldering components together), sorting products, etc. Orders may also be returned, for example, if an order is cancelled, a delivery fails, etc. In some scenarios, while an order is in the process of fulfilment within the hive, it may be cancelled and the product items may need to be returned. In some scenarios, the items may need to be placed again into containers, and the containers moved to various locations. In some scenarios, a workstation may need to conduct tasks to reject/rework products when an order is returned or cancelled.

Furthermore, as mentioned above, individual containers may be in vertical layers, and their locations in the "hive" may be indicated using co-ordinates in three dimensions to represent the robot or a container's position and a container depth (e.g. container at (X, Y, Z), depth W). In some embodiments, locations in the "hive" may be indicated in two dimensions to represent the robot or a container's position and a container depth (e.g. container at (X, Y), depth Z).

The "hive" itself may be a "dynamic" environment, in the sense that robots and workstation locations may be associated with different parts of the hive for engaging in actions. For example, robots may need to access a specific container in a specific location in the hive dimensions (e.g. container at (X, Y, Z), depth W) to fulfil a particular order or to store a product in the "hive". This involves movements of the robots along various possible paths, for example, along the top of the grid, and then accessing particular containers at selected depths of a stack.

The access of particular containers at selected depths of a stack may necessitate the movement of containers which may otherwise obstruct the ability to access a particular container (e.g. where the containers are stacked, a number of containers must be moved first to be able to access a container that is not at an accessible end of the stack). In some embodiments, it may be advantageous to have the system configured to provide for the evaluation and optimisation of a new position for every container that has to be removed to access a target container.

Containers moved off of a stack are not moved back to their original stack positions but are placed in optimised positions. One of the potential advantages is the ability to modify the distribution of containers such that the containers are located in more easily accessible or otherwise more convenient locations.

This may help maintain an optimal distribution of containers within the facility, for example, biasing containers that are expected to be in higher demand in more easily accessible locations, such as locations nearby or within workstations, to reduce travel distance.

Robots may have various shapes, sizes and configurations, and may have various communications means, sensors and tools. In some embodiments, each robot may be able to communicate with the control system through a set of frequency channels established through a set of base stations and base station controllers. Robots may utilize various tools to move and obtain containers from a stack, including, for example, a winch to carry a container. The grid is not limited to rectangular grid elements and may be comprised of curved tracks, tracks up and down, etc. The grid pathways may have intersections and may be accessed by more than one robot Each grid may be segmented, physically or logically, into one or more sub-grids. The grid may be comprised of one or more workstations. Workstations may be manual, semi-automated or fully automated, and may consist of locations or areas where operations are conducted within the hive, or operations are conducted in relation to the hive, containers or products, such as, moving products in or out of the hive, manufacturing products, assembling products, processing products to their components, providing staging locations to support other steps or operations, etc.

Workstations could include, for example, locations where items are moved from inbound carriers, locations where products have various operations conducted on them (e.g.

assembly of components, painting, sorting, packaging, disassembly, reworking products, fixing packaging, replacing products in cancelled orders, rejecting returned products, disposing products), products are moved to outbound carriers, locations with capabilities for refrigeration, locations where components or objects are assembled, locations used for staging or pre-fetching products, locations where robots are repaired and maintained, locations where robots are charged, locations where workers "pick" products to be placed into containers, locations where workers "pick" products to be removed from containers in fulfilment of orders, bags are placed into containers, etc.

Where items/products are returned to the hive, the system may support and/or control the process of bringing back the product, reworking the product, and/or disposing the product if rejected. The scenario may, in some embodiments, involve processing the returned container (which may be a delivery tote or other object as well) at a workstation to determine whether it can be accepted back into the system, whether it needs reworking/repackaging, and/or whether the product should be disposed of instead (e.g. a perishable product has expired).

Workstations may have one or more workers or robots present to conduct various tasks, such as picking items for fulfilment of orders.

In some embodiments, workstations may also be stations with conveyors, refrigerators, various tooling technologies and/or other technology to manipulate, paint, fasten, repair, freeze, heat, expose to chemicals, refrigerate, filter, assemble, disassemble, sort, package, scan, test, transport, store or process goods, containers, etc.

The workstations may have their own pathways within the facility, share pathways with the facility, etc. The workstations may also have various input and output pathways or other types of entry/egress points within the facility.

In some embodiments, the workstations communicate with one or more warehouse management systems to provide information and data related to the status of the workstation, workflow, required containers, issues, status of products held or otherwise manipulated (e.g. sub-components being assembled together), etc.

With specific reference to the features of the first embodiment. The controller is arranged to control the transporting devices which are arranged to transport containers. With reference to FIG. 1, the controller 100 comprises a route determination unit 101, a waypoint generation unit 102, a shunt calculation unit 103 and a clearance unit 104.

The route determination unit 101 is arranged to determine one or more routes from one location on the grid to another location on the grid for each transporting device. More specifically, a transporting device may start from an origin location and need to traverse the grid to a target location. In this regard, the route determination unit 101 may determine a route necessary to traverse the grid based on any number of factors, such as locations of other transporting devices, routes determined for other transporting devices and other factors external to the transporting device as well as factors internal to the transporting device such as battery charge level, acceleration profile, deceleration profile as well as the shortest distance between the origin and the target across the grid. Some of the plurality of routes generated may presently be unable to be executed due to environmental factors, for example, a transporting device may be occupying a cell along the route. The route determination unit 101 may specifically be arranged to plan the paths of transporting devices for use at some point in the future, in other words, the paths determined by route determination unit 101 may not be used immediately.

The waypoint generation unit 102 is arranged to generate at least one leg from each determined route. In particular, a transporting device moving from an origin to a target on the grid accomplishes this movement with one or more legs. Each leg is a traversal in either constant first direction (for example, in a constant X-direction) or a constant second direction (for example, a constant Y-direction).

Figure 2:
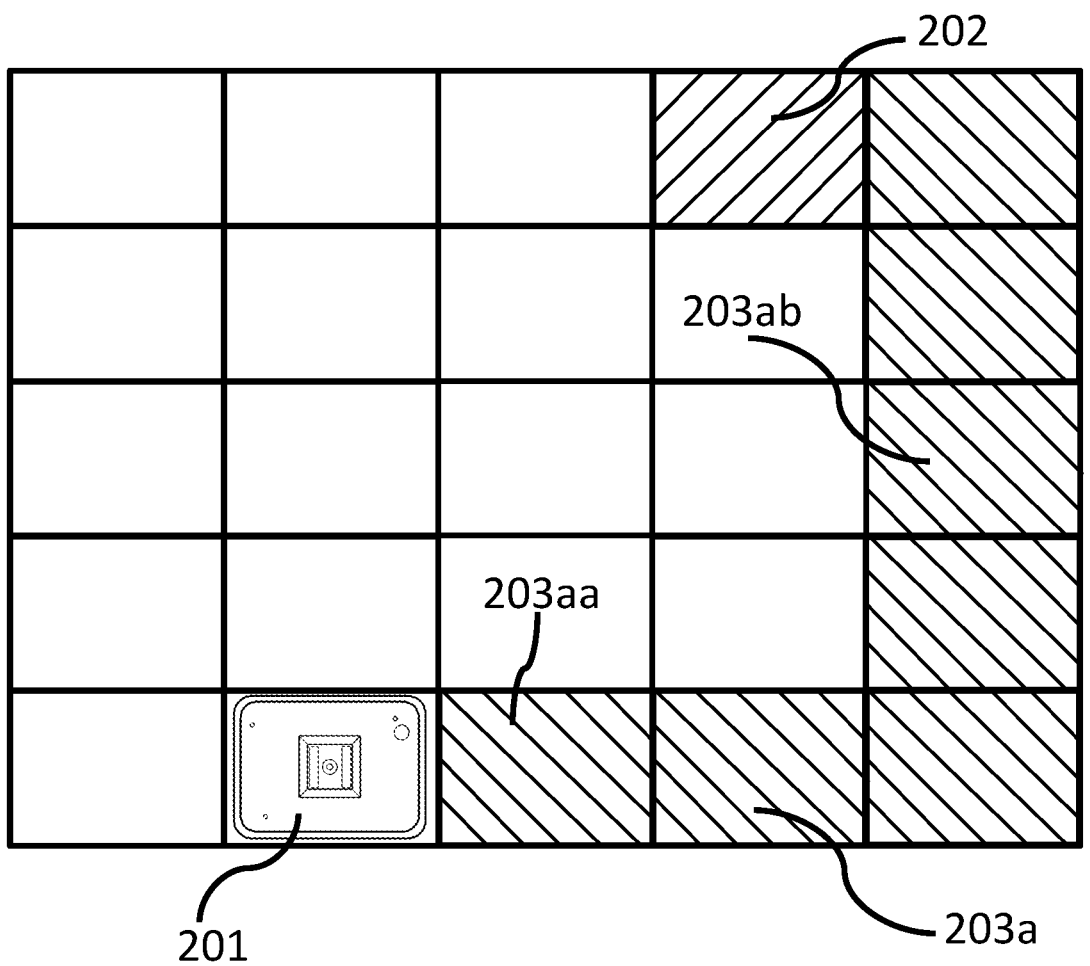
FIG. 2 is a diagram showing a transporting device and a first determined route to a target on the grid.

For example, FIG. 2 shows a transporting device 201 located at an origin location with the purpose of traversing the grid to a target location 202. The target 202 is depicted with bottom left to top right hatching. To achieve this, the route determination unit has determined a first route 203a. The route 203a is depicted with top left to bottom right hatching. The first route 203a may or may not be determined taking into account the expected locations of other transporting devices on the grid. The waypoint generation unit 102 is arranged to generate, based on the first route 203a at least one leg of the route comprising a constant X or Y direction movement of the transporting device 201. For example, as shown in FIG. 2, a first leg 203aa comprises a constant X-direction motion of the transporting device 201. A direction change operation is necessary to be performed by the transporting device 201 to transition to a second leg 203ab of the first route 203a. The second leg 203ab comprises a constant Y-direction motion of the transporting device 201. Although not shown, a third leg is required to move to the final position at the target 202.

FIG. 3 shows an example of a second route 203b determined for the transporting device 201 moving from an origin to a target location 202. The second route 203b comprises a leg 203ba which comprises a constant Y-direction motion of the transporting device 201. It can be seen that the second route 203b comprises fewer cells of the grid as compared to the first route 203a. It may therefore be expected that the second route 203b would require less time to be traversed by the transporting device 201. It may be thought that the shortest route is most preferable to be selected. However, other factors may need to be considered when finally selecting a route to be used by the transporting device 201. To this end, a cost function may be employed to weight each of the various factors to be considered (for example, constant speed may be preferred over acceleration across multiple legs to thereby preserve battery life) and finally select an appropriate route.

Figure 4:
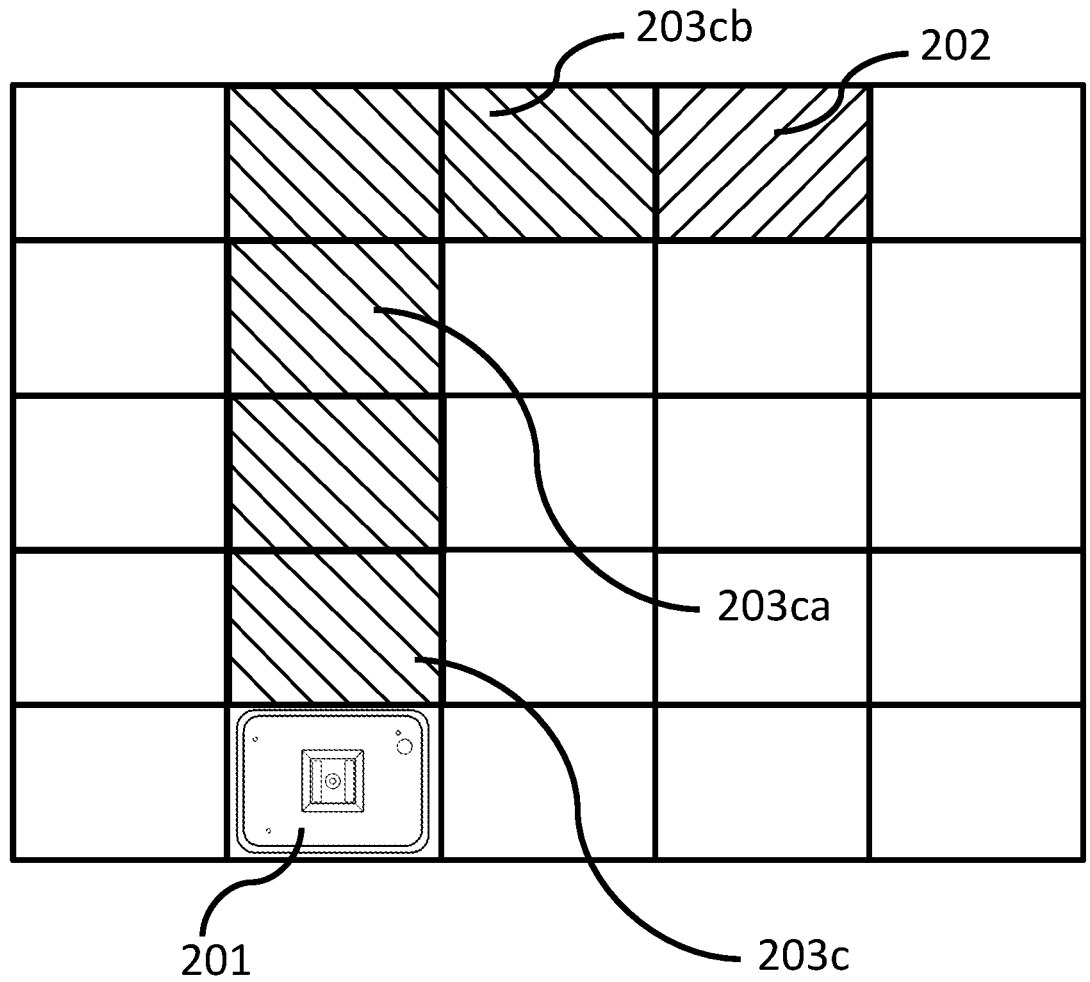
FIG. 4 is a diagram showing a transporting device and a third determined route to a target on the grid.

FIG. 4 shows an example of a third route 203c determined for the transporting device 201 moving from an origin to a target location 202. The third route 203c comprises a first leg 203ca which comprises a constant Y-direction motion. The third route 203c further comprises a second leg 203cb which comprises a constant X-direction motion. A direction change movement of the transporting device 201 is required to transition from the first leg 203ca to the second leg 203cb. Each location at which a direction change occurs may be referred to as a waypoint.

As mentioned previously, the selection of particular routes may be determined based on a number of factors such as acceleration of the transporting device 201 required, amount of time travelling at a constant speed, expected locations of other transporting devices etc. To this end, a route may be selected based on the expectation of routes to be clear of other transporting devices at some future point in time. Therefore, the operations performed by the route determination unit 101 and the waypoint generation unit 102 may be performed of real-time operation of the transporting device 201. In other words, the route may be pre-planned and formed into waypoints ahead of the movement of the transporting device 201.

The operation of the shunt calculation unit 103 may be performed in real-time as the transporting device 201 moves across the grid. Similarly, the clearance unit 104 performs its functions in real-time as the transporting device 201 moves across the grid.

The shunt calculation unit 103 is arranged to calculate, based on the plurality of routes and the generated legs of each route, a shunt path which may be executed by an untasked transporting device for an upcoming leg of a route. To this end, the shunt calculation unit 103 determines whether there are presently any idle transporting devices along one of the predetermined routes. An idle transporting device is one for which no work has been presently assigned, although it might be tasked at some point in the future. For example, a transporting device may have just completed a task having dropped off a container into a grid and may not have another task. Accordingly, until it is assigned task, it can be classed as an idle transporting device and therefore available to be moved by way of a Just In Time Shunt. In this context, a shunt is the movement of an otherwise idle transporting device to another location on the grid, not necessarily to perform a task but rather to move out of the way of another transporting device.

On the other hand a 'tasked' transporting device is one which has been assigned work to be completed such as moving to a location, picking up a container, moving to another location and then dropping off the container. A tasked transporting device, having completed its task, may be assigned a new task. Alternatively, after completing its task the transporting device may become untasked, i.e. idle. Generally, idle transporting devices remain on the last grid cell they were located on as they finished their task. However, they may be shunted off that grid cell if a tasked transporting device needs to be moved on that grid cell.

The route determined for each tasked transporting device may have a specific start time at which point the transporting device is to start the task. In this way, pre-planning of the route and the waypoints used can be achieved for each tasked transporting device. In this way, an optimal plan of tasks to be performed by a plurality of transporting devices can be achieved by evaluating a plurality of routes for each of a plurality of transporting devices starting at a plurality of starting times. In this regard, optimal solutions can be measured by a parameterised cost function. To this end, a predetermined 'planning time horizon' may be used which is a predetermined amount of time prior to execution of the task at which routes are planned for each transporting device. In other words, a route is determined for each transporting device a predetermined amount of time before the route is to be used.

With specific regard to the shunt calculation unit 103, shunts occur where idle transporting devices are moved out of the path of transporting devices undertaking tasks where it is determined to be optimal, by a parameterised cost function, to move the idle transporting device. In this regard, the shunt calculation unit 103 will determine a path to be followed by an idle transporting device. This path is determined at a predetermined time before the idle transporting device shunt needs to start to permit the uninterrupted passage of the tasked transporting device. Typically, the shunt determination occurs as the transporting device is moving along the route and is therefore not pre-planned.

In more detail, the predetermined time before which the shunt movement start must commence may be determined by considering the probability that a shunt solution is pre-calculated and is evaluated by the relative costs of the value of delaying the decision to make a shunt move compared with the costs of having to re-plan a larger number of transporting device routes over a representative period of work for the entire system. For example, the cost is defined as the variation in: grid throughput in terms of orders per hour, picker productivity in terms of items picked per hour, or transporting device productivity in terms of orders per transporting device per hour; or minimise one of the number of transporting devices for a required throughput or the number of pickers for a required throughput. The cost may be further determined using Monte Carlo simulations over a predetermined time period. In this context Monte Carlo simulations are understood to comprise multiple simulations including statistically sampled system factors such as: more than one possible stock-holding scenarios including positioning of containers, quantities of stock keeping units, quantities of items of each stock keeping unit; and at least one of: possible ranges in variations in orders being picked including items and quantities, possible ranges in variations in orders being decanted, possible ranges in variations in pick-times and possible ranges in variations in decant-times; where the simulations are repeated many times with randomly selected values from the statistically varying parameters.

The predetermined time before which the shunt movement start must commence may be determined using a digital twin simulation over a representative period of work for the entire system based on considering the costs and probability that a shunt solution may not be determined in real-time compared with the costs of having to re-plan a larger number of transporting device paths. Where the cost is defined as the variation in: grid throughput in terms of orders per hour, picker productivity in terms of items picked per hour, or transporting device productivity in terms of orders per transporting device per hour; or minimise one of the number of transporting devices for a required throughput or the number of pickers for a required throughput.

The predetermined time before which the shunt movement start must commence may be determined using a digital twin simulation and considers the costs and probability that a shunt solution may not be determined in real-time compared with the costs and probability of having to re-plan a larger number of transporting device paths over a representative period of work for the entire system; where the evaluation is based on multiple simulations including statistically sampled system factors including, including: more than one possible stock-holding scenarios including positioning of containers, quantities of stock keeping units, quantities of items of each stock keeping unit; and at least one of: possible ranges in variations in orders being picked including items and quantities, possible ranges in variations in orders being decanted, possible ranges in variations in pick-times and possible ranges in variations in decant-times; where the digital twin simulations are repeated many times with randomly selected values from the statistically varying parameters and the parameter value is determined to maximise one of: grid throughput in terms of orders per hour, picker productivity in terms of items picked per hour, or transporting device productivity in terms of orders per transporting device per hour; or minimise one of the number of transporting devices for a required throughput or the number of pickers for a required throughput. In this context, a digital twin simulation is considered to be a high fidelity simulation which employs actual elements (e.g. software) of an expected real-world scenario within the simulation so that the output of the simulation most closely matches the expected performance when operating in the real-world.

In this way, more optimal shunt moves may be determined because shunt moves are not planned which are later deemed unnecessary and whose existence causes the route planning for other transporting devices to be allocated around the unnecessary shunt move, reduces the optimality of the route planning. Instead, shunts are sometimes or always delayed in their planning until closer to the time that the idle transporting device needs to be shunted. Typically, idle transporting devices are moved to the nearest grid location which has no reservations by other transporting devices. In this way, the shunt does not cause further conflicts with other transporting devices.

Once it is determined that a particular transporting device is eligible to be shunted then the controller 100 may be further arranged to instruct the transporting device to relocate to another location on the grid.

Figure 5:
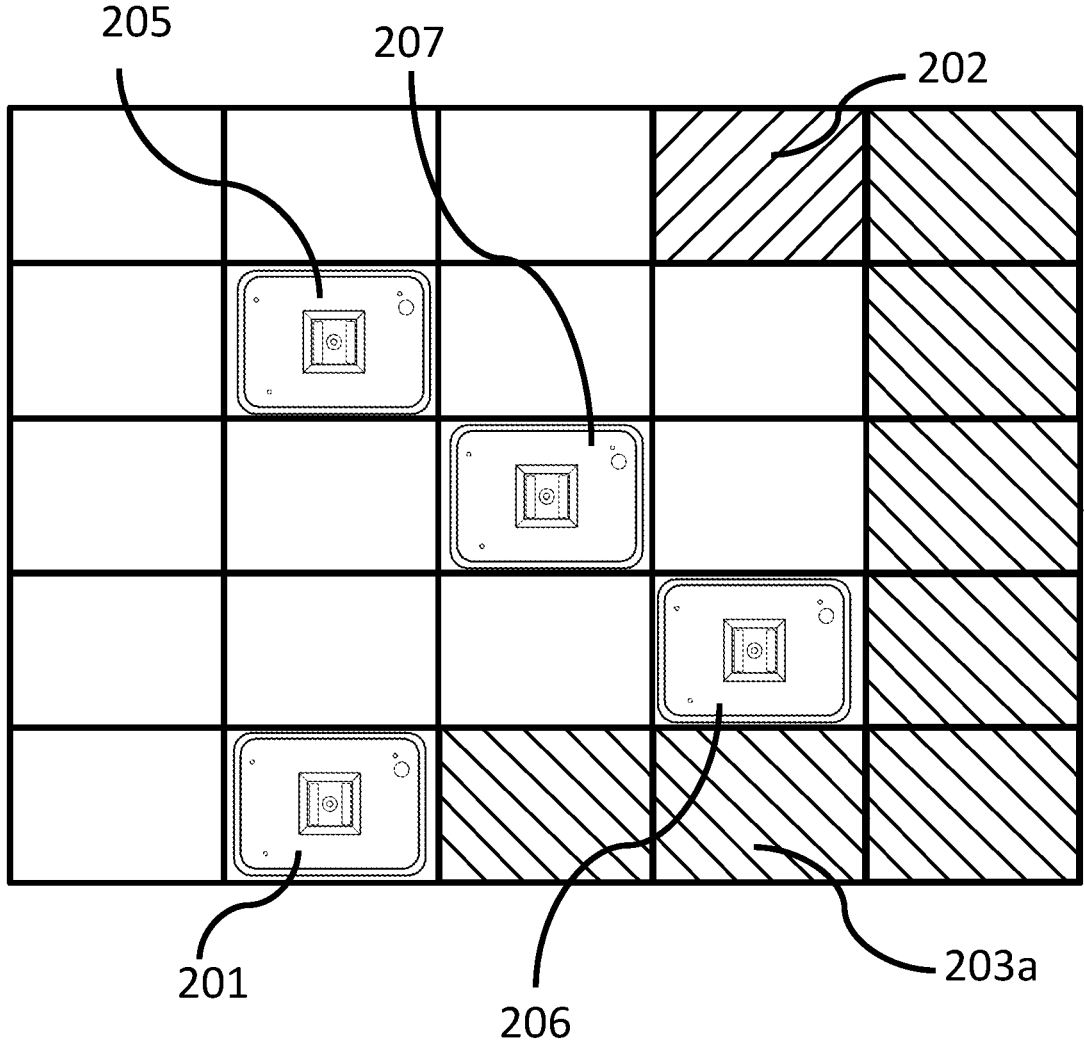
FIG. 5 is a diagram showing a transporting device moving along a first determined route to a target on the grid.

For example, FIG. 5 shows an example of a real-time movement of transporting device 201 from the origin to the target location 202. In this example, transporting device 201 is unable to travel by the second route 203b and third route 203c because of transporting devices 205-207 which are located on the grid. In this example, none of transporting devices 205-207 are available to be shunted. Therefore, the shunt calculation unit 103 need not calculate shunt paths for each of transporting devices 205-207 because they will not be shunted. The controller has therefore selected the route first 203a because it avoids the location of each of the transporting device 205-207. Therefore the transporting device 201 proceeds by a route which is unencumbered by other transporting devices.

Figure 6:
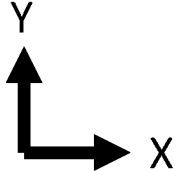
FIG. 6 is a diagram showing a transporting device moving along a second determined route to a target on the grid.

On the other hand, FIG. 6 shows a different example of real-time movement of transporting device 201 this time by way of the second route 203b. To achieve this, the controller 100 has calculated that transporting device 207 is available to be shunted to another location. In this example, as compared to FIG. 5, the transporting device 207 can be moved to move it out of path of the second route 203b. Therefore, the second route 203b was selected by the controller 100 by way of, for example, a cost function thereby deciding that the second route 203b is more optimal than the first route 203a shown in FIG. 5. Although the controller 100 has identified that the transporting device 207 can be moved, it is not until a predetermined time before which the shunt must occur is a path for the shunting of the transporting device 207 actually determined by the shunt calculation unit 103. For example, not until the transporting device 201 has completed the first leg of the second route 203b (i.e. the leg prior to the shunt) is a path for the transporting device 207 determined by the shunt calculation unit 103.

To this end, the planning of the shunt of transporting devices is delayed to a predetermined time before the shunt needs to start to permit the uninterrupted passage of the tasked transporting device. In this way, a more optimal shunt path of the non-tasked transporting device may be achieved, because it occurs later in time that pre-planned shunt movements. Moreover, a more optimal path of movement for the tasked transporting device is achieved because routes can be selected which are more optimal as determined by a cost function. However, it is accepted that in certain circumstances a shunt path is not possible and as such a re-plan of a larger number of transporting devices may have to occur.

In this example, the shunt calculation unit 103 has determined to move the transporting device 207 one grid space in the negative X-direction as the shunt path for the transporting device 207. Therefore, the transporting device 207 clears the path for transporting device 201 in a more optimal manner.

FIG. 6 also shows the operation of the clearance unit 104 by way of grid cell 204. The clearance unit 104 is arranged to provide clearance for each transporting device to traverse a portion of the determined route. Due to imprecise measurements of each transporting device, for example, due to differing acceleration profiles between transporting devices or different speeds of transporting devices and other errors, such as communication loss and transporting device failure, the exact position of each transporting device is not known at a given moment. Therefore, it is necessary to account for these imprecise measurements. For this reason, a clearance unit 104 is used to clear a portion of a determined route for the transporting device so that the transporting device only traverses a portion of the route at a time. For example, for a straight section of determined route ten grid cells in length, the clearance unit may be arranged to clear the transporting device to traverse only three of the grid cells at one time by determining, based on the amount of time the transporting device will need to traverse three grid cells, whether the next three grid cells are clear for traversal and thereby permit the transporting device to proceed. For example, clearance may be determined based on whether other transporting devices are expected to conflict on the same grid cells at the same time. As will be appreciated, clearance occurs such that as each grid cell is successfully traversed by the transporting device, the next grid cell of the cleared section is cleared for traversal by the transporting device. In another example, where a direction change is required by the transporting device, the transporting device may be cleared up to the corner at which the transporting device is required to perform the direction change. In this way, portions of the determined route are cleared, portion by portion, for traversal by the transporting device.

In a preferred embodiment, the present inventors have found a preferred manner to mostly account for the compounded error although a clearance unit 104 is needed to provide clearance for a transporting device to transverse a portion of the determined route. In particular, a transporting device moving from an origin to a target on the grid accomplishes this movement with the one or more legs determined by the waypoint generation unit 102. In other words, the determined route is broken up into one or more legs, each of which has its compounded error reset at the start of each leg. Each leg is a traversal in either constant first direction (for example, in a constant X-direction) or a constant second direction (for example, a constant Y-direction). The controller 100 is arranged to allow sufficient tolerance on each leg to allow for the non-erroneous statistical variation in transporting device performance over the transporting device population; in terms of first/second direction translation; wheel change; and internal clock variation; as wheel as potential transmission delays of transporting device commands to the transporting devices and status messages from the transporting devices. Thereby the determined route provides sufficient time tolerance to allow (non-erroneous) transporting devices arriving late at the end of one leg to start the next leg at the planned time thereby addressing the accumulated error. For transporting device arriving at the end of a leg early; the transporting device simply waits until the nominal start time of the following leg; before starting that leg.

As shown in FIG. 6, although route 203b is planned by the route determination unit 101, due to uncertainties in the exact position each transporting device and variations in acceleration, deceleration and constant velocities of each transporting device it is possible that each transporting device cannot merely follow its determined route 203b without risk of conflict between two transporting devices. To that end, the clearance unit 104 is arranged to clear only a portion of the determined route 203b thereby ensuring that a predetermined number of grid squares ahead of the transporting devices current motion is cleared of any other transporting device (based on the latest transporting device location information). In this way, the risk of transporting device collision is avoided.

The clearance is typically performed, for example, on a straight section of determined route 203b for the minimum number of cells of the grid required for the transporting device to come to a stop without collision risk. For example, if the transporting device is travelling at a speed which requires two grid cells to completely stop then the clearance unit 104 is arranged to clear two cells in front of the current transporting device such that, when required, the transporting device can come to a halt without collision risk. In another example, if the transporting device is travelling at a speed which requires 2.5 grid cells to come to a stop then the clearance unit 104 clears 3 grid cells in front of the transporting device to ensure that the transporting device can come to a stop entirely contained within one grid cell, thereby ensuring that a transporting device does not overlap with other grid cells once it has come to a stop.

Moreover, as shown in FIG. 6, where a direction change of the transporting device is required a predetermined distance in front of the transporting device, then the clearance unit 104 is arranged to clear the determined route 203b up until the corner where the direction change occurs. In the example shown in FIG. 6, the cleared portion 204 of the route 203b is shown with cross hatched lines.

Optionally, a number of actions may be performed when the clearance unit 104 withholds clearance for the transporting device to traverse a portion of the route. In particular, once clearance for a transporting device is withheld, there is no cleared route for the transporting device to move in and therefore one option would be for the transporting device to merely stop moving. However, this causes a hazard on the grid for other transporting devices which must be navigated around. Moreover, the function being performed by the transporting device still needs to be fulfilled. Therefore, the present inventors have realised a number of advantageous solutions to control the movement of the transporting device once clearance is withheld.

For example, the route determination unit 101 may be arranged to re-determine a route for the transporting device to traverse the grid. The route re-determination being performed at a new time may result in a similar route being re-determined, perhaps even traversing the same constraint area because the constraint limit may have fallen below the predetermined threshold. Alternatively, a route may be re-determined so as to avoid the constraint area for which clearance was withheld. Alternatively, or in addition, the route determination means 101 may be arranged to re-determine the routes of at least two of the plurality of transporting devices. Similar to the explanation above, by re-determining routes for at least two of the plurality of transporting devices, transporting devices can be designated on routes which avoid one another. Alternatively or additionally, the controller 100 may be arranged to perform a controlled stop of the transporting device. In this regard, a controlled stop of a transporting device is defined as bringing the transporting device to a stop in the first complete grid cell for which the transporting device can stop without collision risk—in other words, not bringing the transporting device to a stop half in one grid cell and half in another grid cell. For example, if the transporting device is able to stop in two grid cells from a particular speed, then a controlled stop of the transporting device would be commanded for the transporting device to stop in two grid cells so that it is fully contained within one grid cell—not protruding into any other grid cell. On the other hand, if the transporting device would require 2.5 grid cells to stop without collision risk from a particular speed then the transporting device will be commanded to stop in 3 grid cells—rounding up the number of grid cells. In this way, the transporting device stops in a complete grid cell without protruding into any other grid cell. Alternatively or additionally, the controller 101 may be arranged to command a controlled stop for a least two of the plurality of transporting devices. In this way, a number of transporting devices are brought to a stop without collision risk when a transporting device is withheld clearance.

Although operation of the clearance unit 104 has been described in relation to the first transporting device, clearance will also be provided to second transporting device as it moves along the calculated shunt path. If the shunt path comprises multiple legs then clearance will be provided for each leg of the shunt path. In this way, the collision safe movement of the second transporting device is assured. Moreover, each leg may be a subdivision of the total path, for example, a leg may comprise movement across a few cells, such as three cells. Similarly, if a direction change is required then the portion before the direction change may be one leg whilst the portion after the direction change may be a second leg.

FIG. 7 shows a flowchart of method steps to be performed by a controller according to a first embodiment of the present invention. The method is for controlling the movement of a plurality of transporting devices.

The method S700 starts at step S701 which comprises determining a plurality of routes on a grid-like structure. In this step, for a first transporting device, a plurality of routes are determined from an initial, starting, location to a final, destination, location. Multiple routes between the locations are possible and step S701 determines a plurality of these potential routes. When determining the plurality of routes, step S701 may take into account various factors such as the ability of the transporting device to accelerate, brake, change direction. Additionally, the determining step S701 may also take into account factors affecting the route such as the overall distance that would be required to travel, the number of stretches of the route which are in one constant direction, the number of direction changes required along the route. These factors may help to narrow the problem field and to determine the plurality of routes.

In addition, step S701 may also take into account whether transporting devices are available to be shunted from a current position to thereby clear a route of an otherwise blocking transporting device. A transporting device available to be shunted is a transporting device which is currently not tasked to perform any actions and is effectively 'parked' on a location waiting for future instructions. In this regard, the position of their parking is not essential and therefore they could potentially be moved, if possible, to another location to thereby clear a path which may be preferably for the first transporting device to pass unimpeded.

At step S702, each of the plurality of routes determined in step S701 are broken down into at least one leg. A leg is envisaged to be a portion of a route which occurs in a constant direction. For example, a route projected onto a two-dimensional grid upon which the transporting device is only able to move in an X-direction or a Y-direction at one time, a leg is envisaged to be movement in one of the X-direction or the Y-direction. In this way, a route requiring a diagonal movement across the two-dimensional grid could perform the movement in two legs, an X-direction leg crossing the necessary columns until reaching the appropriate column for the destination and then a Y-direction leg crossing the necessary rows until reaching the destination.

At step S703, a shunt path is calculated for a transporting device which is to be shunted. In this regard, a particular route may have been selected as the one selected to be traversed by the first transporting device. The selected route may rely on the shunting of second transporting device to thereby clear the route for the unimpeded movement of the first transporting device. However, the shunt path is not calculated in step S701 when determining routes, instead the shunt path is calculated at a predetermined time before the second transporting device must move to permit the first transporting device to pass through a location. For example, the predetermined time may be just before the first transporting device starts the leg on which the conflict between the first and second transporting devices is due to occur. In this way, by delaying the calculation of the shunt path until closer to the time of execution of the effectiveness of planning can be increased. More specifically, in some cases a shunt planned in step S701 may never be executed because the idle transporting device is subsequently tasked before the shunt were due to start. This causes a waste of processing performance resulting in diminished efficiency. Therefore, by planning shunts very close to the time at which they need to be executed thereby provides a more efficient solution to transporting device shunting because very close to the execution time there is a very small probability that the plan will change in a way that the shunt needs to be recalculated. In this regard, the system may be designed so that the probability is low enough so that, on average, a benefit is seen to shunting versus not shunting.

It is envisaged that once the shunt has been planned and the first transporting device begins traversing a selected route then the second transporting device (the transporting device to be shunted) will also begin to traverse the calculated shunt path at a designated start time.

At step S704, clearance for the first transporting device is provided to traverse the selected route. In this context, clearance relates to the practice of only permitting the first transporting device to move a certain distance and then halt, unless the controller provides further instructions to move further. Typically, clearances for movement are provided for each leg of a route. In this way, a transporting device can move a certain portion of the route and would then safely come to a stop unless the controller deems further movement possible. In this way a passively collision risk free system is achieved in which the system will default to a safe state if system control is lost.

Such a collision safe system is necessary because expected transporting device physics may not match real-world transporting device physics. For example, the braking ability of a transporting device may be slightly impaired and thereby result in transporting devices which overrun locations or the like. If this occurs, clearance to traverse the next leg may be withheld whilst routes for one or more transporting devices are re-calculated to take into account the overrunning of the transporting device.

Modifications and Variations

Many modifications and variations can be made to the embodiments described above, without departing from the scope of the present invention.

In a further modification, the controller 100 may further comprise a movement control unit arranged to control movement of the plurality of transporting devices. In this modification, the controller 100 directly controls how each transporting device moves rather than more general commands of which route to take across the grid and whether the transporting device is cleared to traverse a particular constraint area. In this modification, the controller 100 may make further commands to each transporting device whether to move in a particular direction, whether to accelerate/ decelerate, whether to continue moving at a constant velocity. In this way, the controller 100 exerts direct control over each transporting device which may be useful because the controller 100 has information of all of the transporting devices and therefore may need to issue direct commands to the motors and mechanisms of a transporting device to avoid another transporting device or otherwise route the transporting device in a manner that control by each transporting device would be unable to achieve.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by transporting devices operative on tracks located on the top of the frame structure. The transporting devices lift bins or containers out from the stacks, multiple transporting devices co-operating to access bins or containers located in the lowest positions of the stack. A system of this type is illustrated schematically in FIGS. 8 to 11 of the accompanying drawings.

Figure 8:
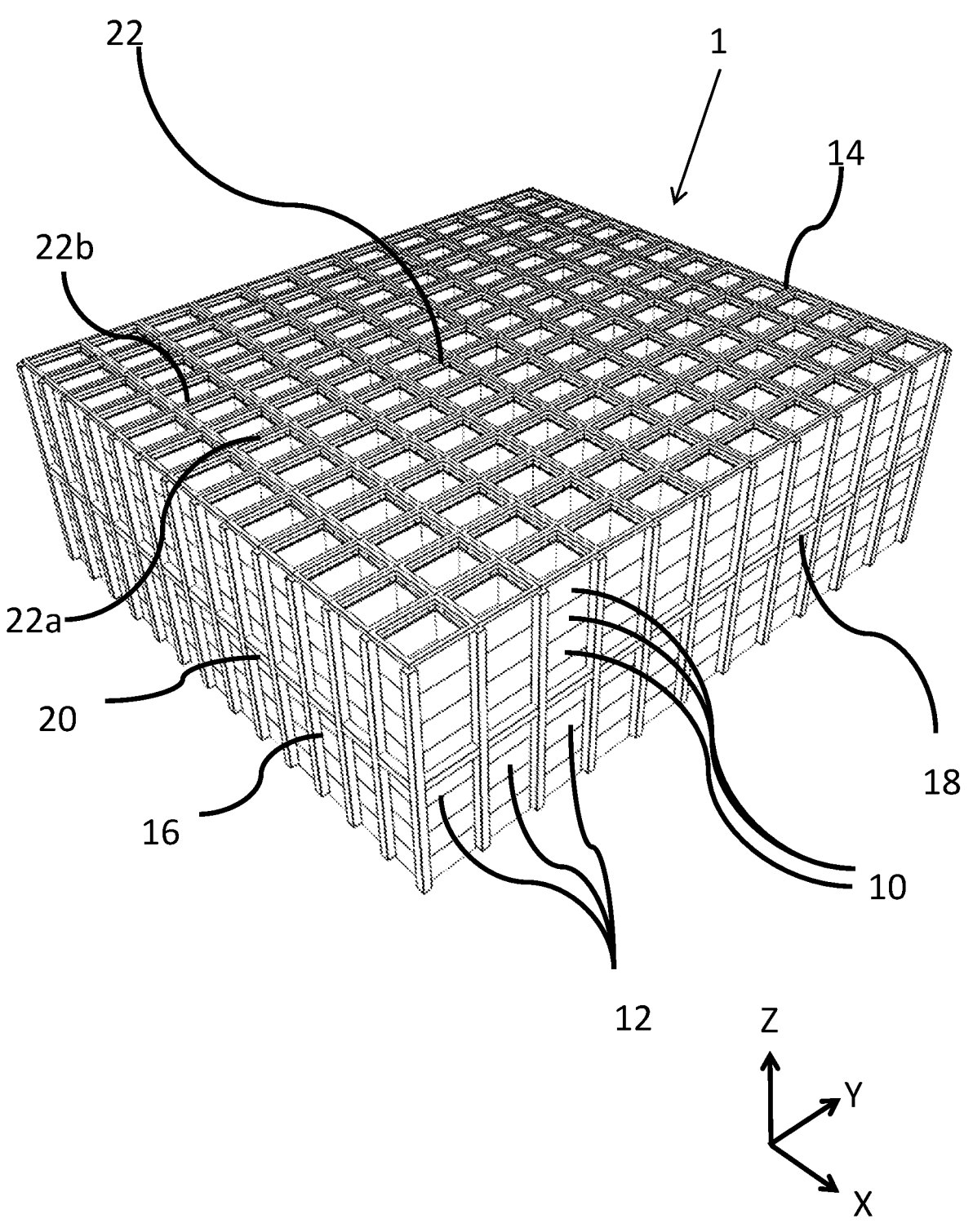
FIG. 8 is a schematic diagram of a framework structure according to a known system.
Figure 9:
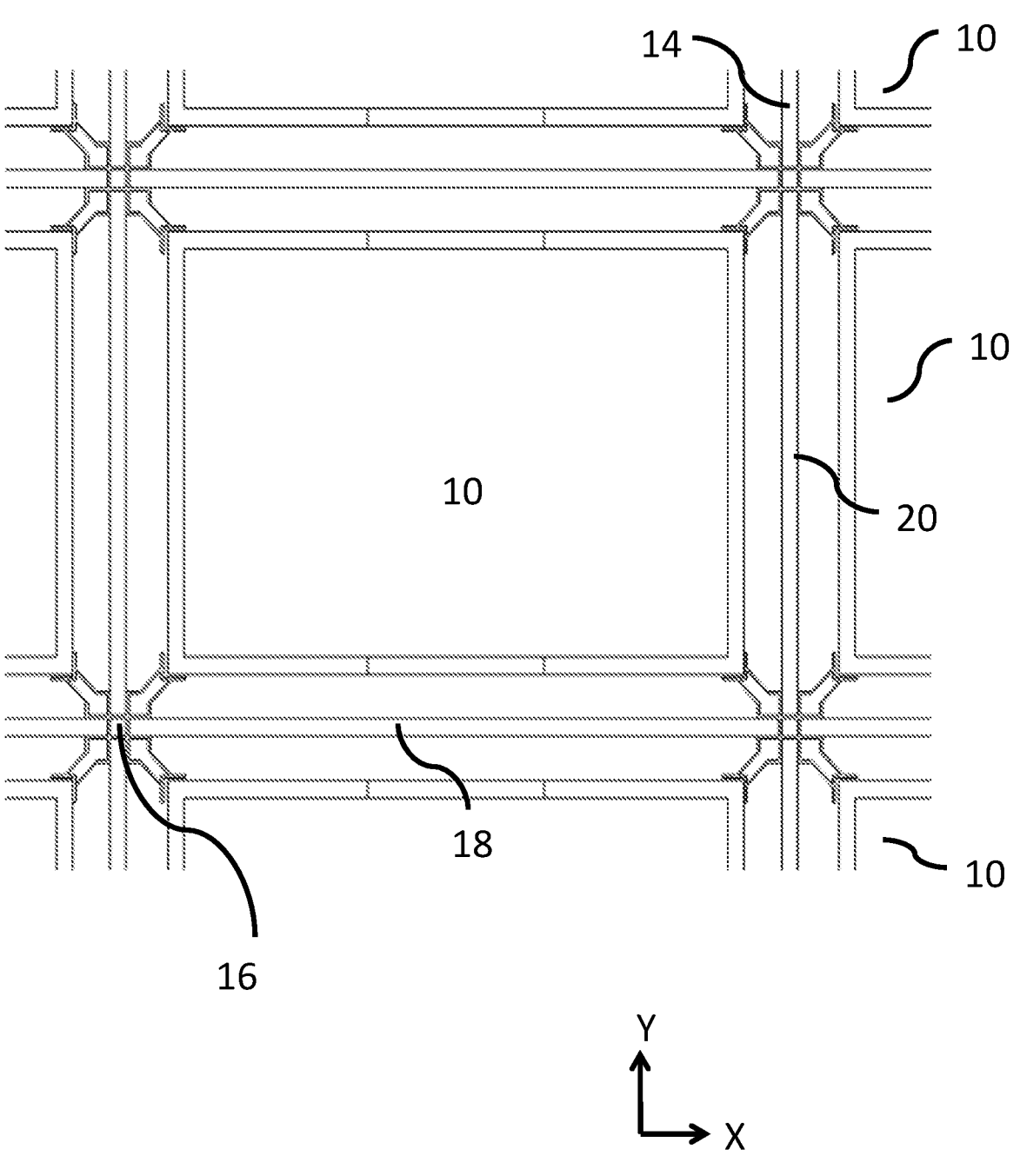
FIG. 9 is a schematic diagram of a top-down view showing a stack of bins arranged within the framework structure of FIG. 8.

As shown in FIGS. 8 and 9, stackable containers, known as bins 10, are stacked on top of one another to form stacks 12. The stacks 12 are arranged in a grid framework structure 14 in a warehousing or manufacturing environment. FIG. 8 is a schematic perspective view of the framework structure 14, and FIG. 9 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

The top level of the frame structure 14 includes rails 22 arranged in a grid pattern across the top of the stacks 12.

Figures 10A, 10B, 10C:
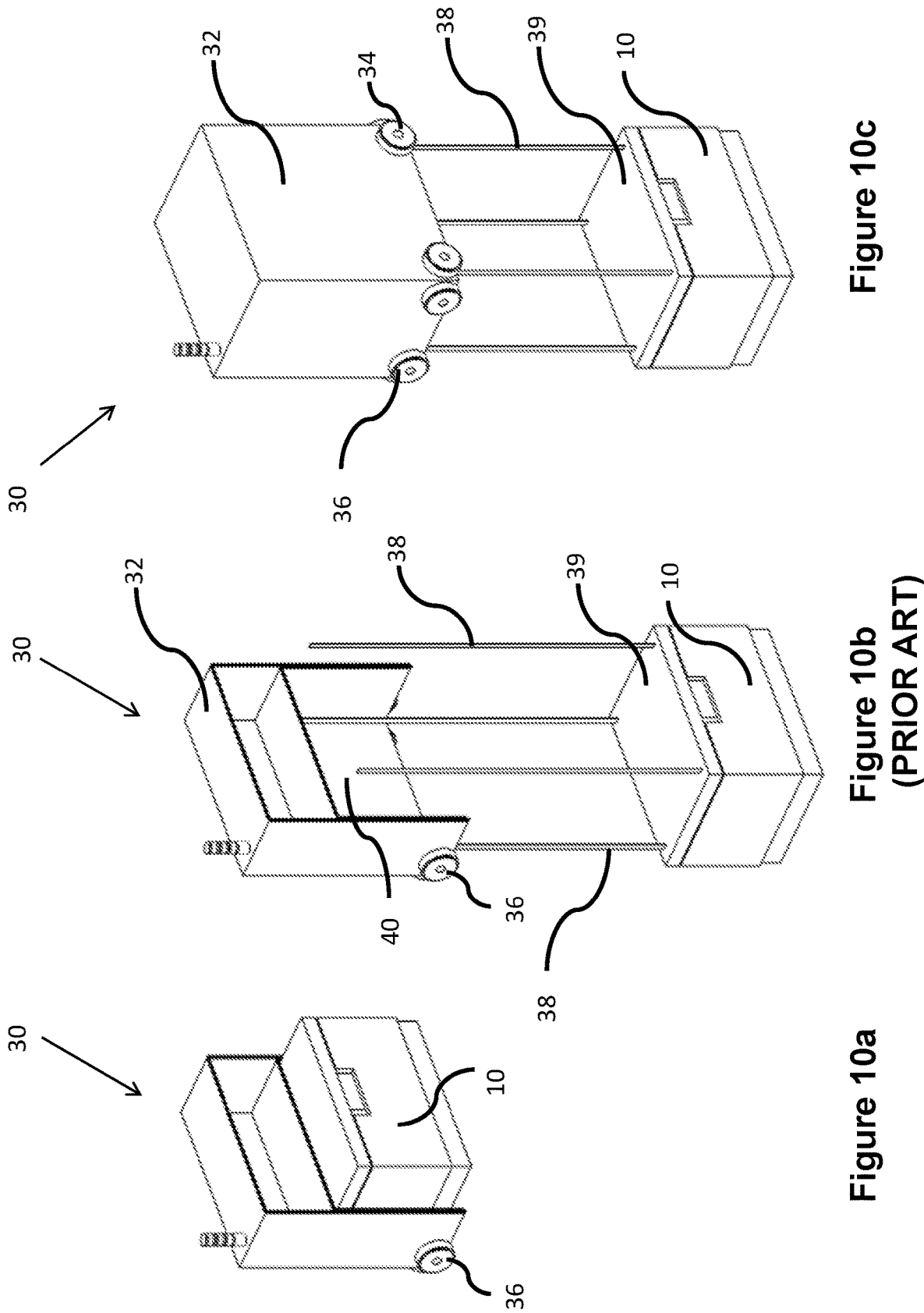
FIGS. 10a and 10b are schematic perspective views of a transporting device depositing a bin and FIG. 10c is a schematic front perspective view of a transporting device lifting a bin.
Figure 11:
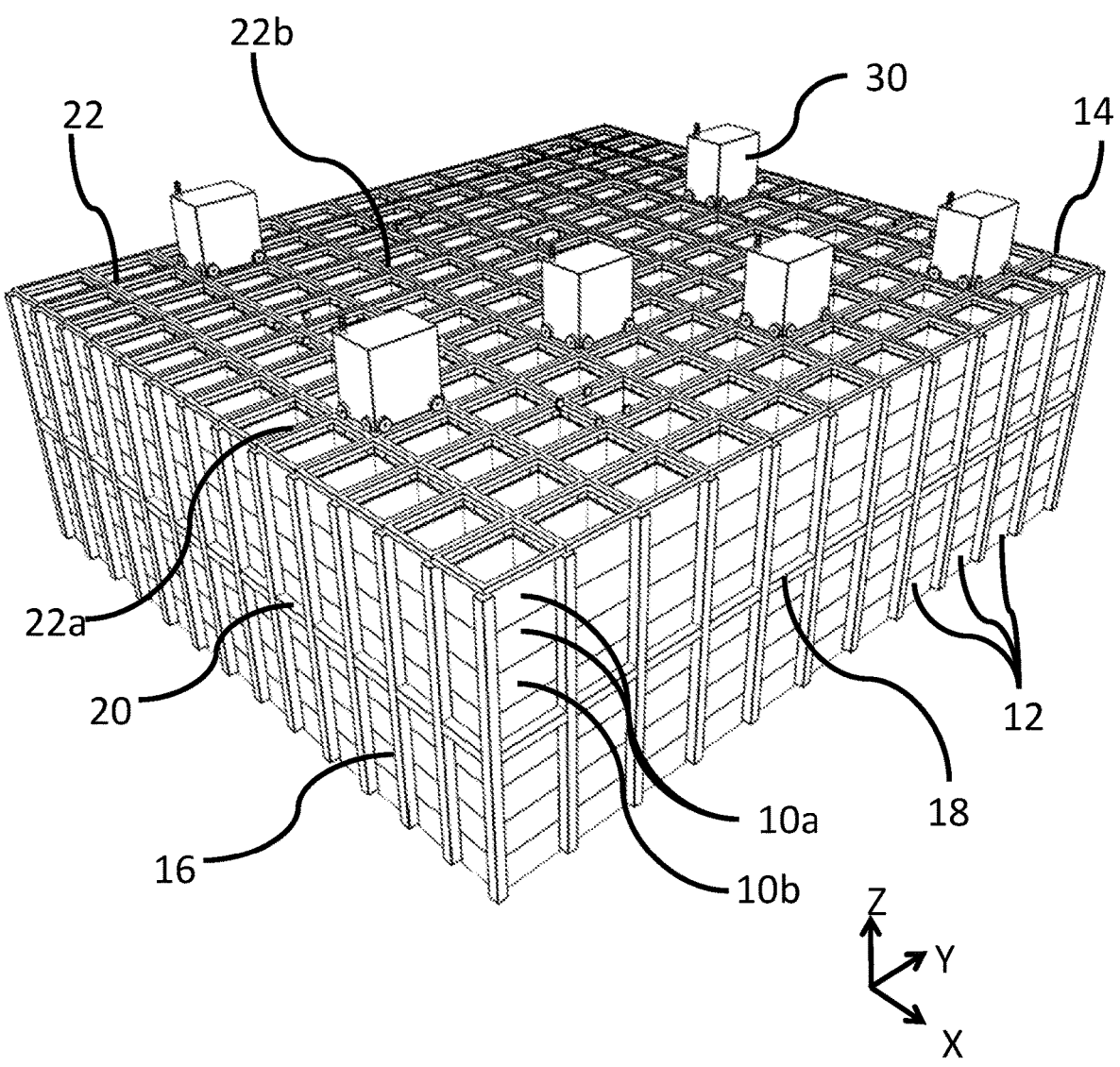
FIG. 11 is a schematic diagram of a system showing transporting devices operating on the framework structure.

Referring additionally to FIGS. 10 and 11, the rails 22 support a plurality of robotic transporting devices 30. A first set 22a of parallel rails 22 guide movement of the transporting devices 30 in a first direction (X) across the top of the frame structure 14, and a second set 22b of parallel rails 22, arranged perpendicular to the first set 22a, guide movement of the transporting devices 30 in a second direction (Y), perpendicular to the first direction. In this way, the rails 22 allow movement of the transporting devices 30 laterally in two dimensions in the horizontal X-Y plane, so that a transporting device 30 can be moved into position above any of the stacks 12.

One form of transporting device 30 is further described in Norwegian patent number 317366, the contents of which are incorporated herein by reference. FIGS. 10a and 10b are schematic cross sectionals views of a transporting device 30 depositing a bin 10, and FIG. 10c is a schematic front perspective view of a transporting device 30 lifting a bin 10. However, there are other forms of transporting device that may be used in combination with the system herein described. For example a further form of robotic transporting device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each transporting device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the transporting device 30 in the X direction. To move the transporting device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The transporting device 30 is equipped with a lifting device. The lifting device 40 comprises a gripper plate 39 is suspended from the body of the transporting device 32 by four cables 38. The cables 38 are connected to a winding mechanism (not shown) housed within the vehicle 32. The cables 38 can be spooled in or out from the transporting device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the transporting device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 10*c*. The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the transporting device 30 can be moved to a different position in the X-Y plane, carrying the bin 10 along with it, to transport the bin 10 to another location. The cables 38 are long enough to allow the transporting device 30 to retrieve and place bins from any level of a stack 12, including the floor level. The weight of the vehicle 32 may be comprised in part of batteries that are used to power the drive mechanism for the wheels 34, 36.

As shown in FIG. 11, a plurality of identical transporting devices 30 are provided, so that each transporting device 30 can operate simultaneously to increase the throughput of the system. The system illustrated in FIG. 11 may include specific locations, known as ports, at which bins 10 can be transferred into or out of the system. An additional conveyor system (not shown) is associated with each port, so that bins 10 transported to a port by a transporting device 30 can be transferred to another location by the conveyor system, for example to a picking station (not shown). Similarly, bins 10 can be moved by the conveyor system to a port from an external location, for example to a bin-filling station (not shown), and transported to a stack 12 by the transporting devices 30 to replenish the stock in the system.

Each transporting device 30 can lift and move one bin 10 at a time. If it is necessary to retrieve a bin 10*b* ("target bin") that is not located on the top of a stack 12, then the overlying bins 10*a* ("non-target bins") must first be moved to allow access to the target bin 10*b*. This is achieved in an operation referred to hereafter as "digging".

Referring to FIG. 11, during a digging operation, one of the transporting devices 30 sequentially lifts each non-target bin 10*a* from the stack 12 containing the target bin 10*b* and places it in a vacant position within another stack 12. The target bin 10*b* can then be accessed by the transporting device 30 and moved to a port for further transportation.

Each of the transporting devices 30 is under the control of a central computer. Each individual bin 10 in the system is tracked, so that the appropriate bins 10 can be retrieved, transported and replaced as necessary. For example, during a digging operation, the locations of each of the non-target bins 10*a* is logged, so that the non-target bins 10*a* can be tracked.

The system described with reference to FIGS. 8 to 11 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10*b* is not at the top of a stack 12.

Although the above description has been made with reference to transporting devices, which may also be known as load handling devices, this need not be the case. In particular, the process of shunting may be equally applied to other vehicles or devices located on the rails. For example, recovery vehicles may be operating on the rails for use when retrieving a defective transporting device. To this end, the recovery vehicle may operate autonomously or with a human operator, in either case, it's location on the rail may be modified by application of the above described shunting system to be moved out of the path of a first transporting device. Similarly, robotic arms may be installed on the rails for use in picking items from containers stored beneath the rails. It is envisaged that such robotic arms may be shunted, for example by moving the physical base position of the robotic arm or by moving the some elements of the robotic arm itself so as to permit the uninterrupted passage of a first transporting device.

With respect to computer-implemented embodiments, the description provided may describe how one would modify a computer to implement the system or steps of a method. The specific problem being solved may be in the context of a computer-related problem, and the system may not be meant to be performed solely through manual means or as a series of manual steps. Computer-related implementation and/or solutions may be advantageous in the context of some embodiments; at least for the reasons of providing scalability (the use of a single platform/system to manage a large number of inputs and/or activities); the ability to pull together quickly and effectively information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as quickly changing order flow or logistical conditions); the ability to apply complex logical rules that would be infeasible through manual means; the ability for orders to be truly anonymous; among others.

Using electronic and/or computerised means can provide a platform that may be more convenient, scalable, efficient, accurate, and/or reliable than traditional, non-computerised means. Further, systems may be computerised and the platform may advantageously be designed for interoperability, and manual operation may be difficult and/or impossible. Further, manual operation, even if feasible, is unlikely to achieve comparable efficiency and/or Scalability may be useful as it may be advantageous to provide a system that may be able to effectively manage a large number of inputs, outputs and/or interconnections and/or integration with external systems.

The convenience and effectiveness of a solution may be valuable in the context of order fulfilment as individuals may have more information available to make better ordering and/or fulfilment decisions.

Figure 12:
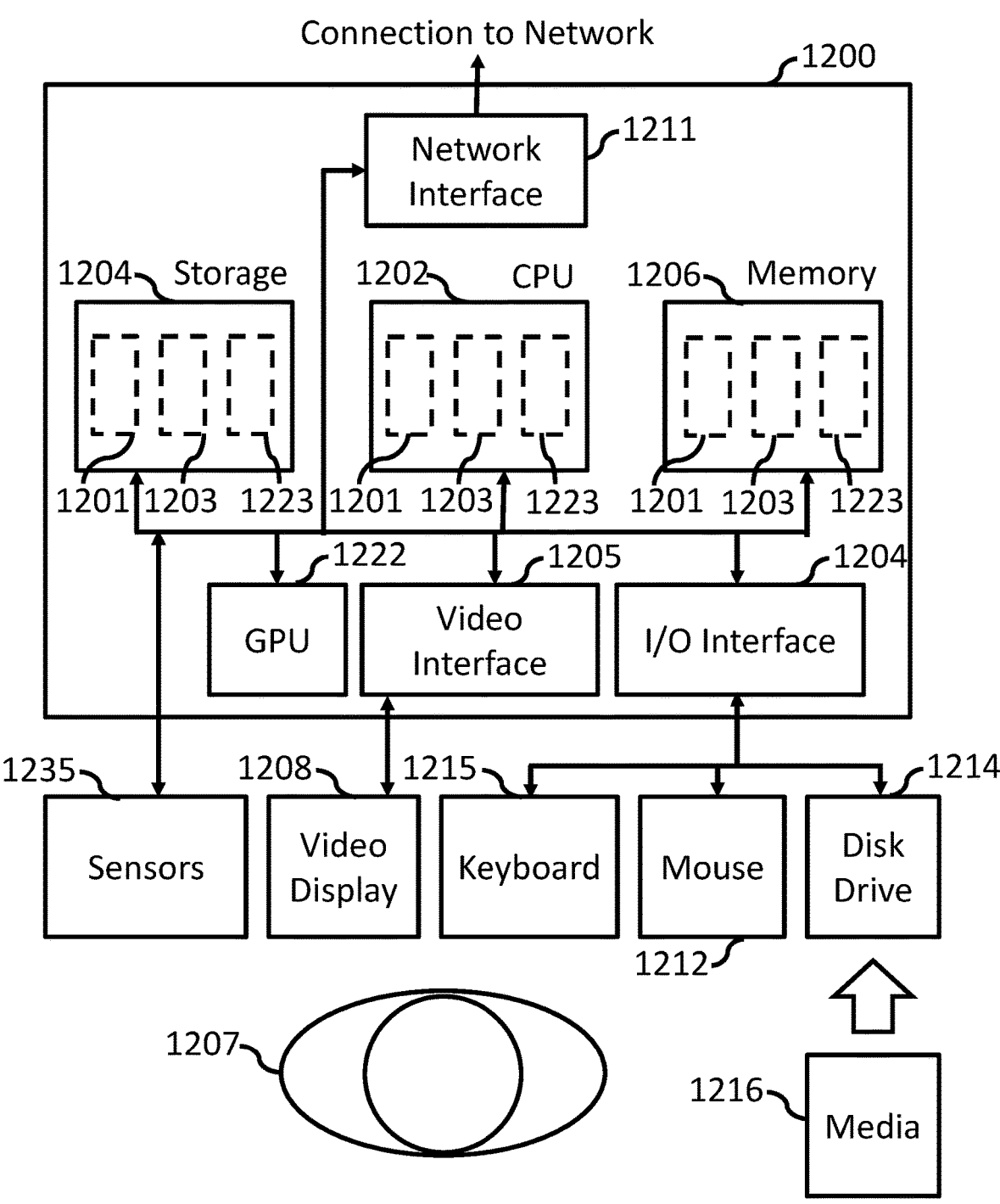
FIG. 12 is a schematic diagram of a hardware configuration of a controller according to FIG. 1.

The present system and method may be practiced in various embodiments. In particular, the functionality of the controller 100 is envisaged to be performed by, for example, a processor and/or computing device of the type shown in FIG. 12. A suitably configured computer device, and associated communications networks, devices, software and firmware may provide a platform for enabling one or more embodiments as described above. By way of example, FIG. 12 shows a computer device 1200 that may include a central processing unit ("CPU") 1202 connected to a storage unit 1214 and to a random access memory 1206. The CPU 1202 may process an operating system 1201, application program 1203, and data 1223. The operating system 1201, application program 1203, and data 1223 may be stored in storage unit 1214 and loaded into memory 1206, as may be required. Computer device 1200 may further include a graphics processing unit (GPU) 1222 which is operatively connected to CPU 1202 and to memory 1206 to offload intensive image processing calculations from CPU 1202 and run these calculations in parallel with CPU 1202. An operator 1207 may interact with the computer device 1200 using a video display 1208 connected by a video interface 1205, and various input/output devices such as a keyboard 1215, mouse 1212, and disk drive or solid state drive 1214 connected by an I/O interface 1204. In known manner, the mouse 1212 may be configured to control movement of a cursor in the video display 1208, and to operate various graphical user interface (GUI) controls appearing in the video display 1208 with a mouse button. The disk drive or solid state drive 1214 may be configured to accept computer readable media 1216. The computer device 1200 may form part of a network via a network interface 1211, allowing the computer device 1200 to communicate with other suitably configured data processing systems (not shown). One or more different types of sensors 1235 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application. The functionality described may be implemented to any mobile platform, including the Android platform, iOS platform, Linux platform or Windows platform.

In further aspects, the disclosure provides systems, devices, methods, and computer programming products, including non-transient machine-readable instruction sets, for use in implementing such methods and enabling the functionality described previously.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A controller configured to control movement of a plurality of transporting devices, the controller comprising:
    a route determination unit configured to determine a plurality of routes from one location on a grid-like structure to another location on the grid-like structure for a first transporting device;
    a waypoint generation unit configured to generate at least one leg for each of the plurality of routes determined by the route determination unit;
    a shunt calculation unit configured to calculate a shunt path for a second transporting device so as to shunt the second transporting device, wherein the shunt path is calculated at a predetermined time before which the second transporting device must commence movement to permit an uninterrupted passage of the first transporting device; and
    a clearance unit configured to provide clearance for the first transporting device to traverse a leg of a determined route,
    wherein the controller is configured to control the first transporting device to traverse the at least one leg of the determined route, wherein a portion of the at least one leg includes the uninterrupted passage.

2. The controller according to claim 1, wherein the shunt calculation unit is configured to calculate the shunt path for the second transporting device at a predetermined time before the first transporting device reaches a current position of the second transporting device.

3. The controller according to claim 1, wherein the shunt calculation unit configured to calculate the shunt path for the second transporting device whilst the first transporting device is moving in a leg immediately before a leg in which the second transporting device is located.

4. The controller according to claim 1, wherein the shunt calculation unit is configured to calculate the predetermined time before which the shunt path is calculated for the second transporting device; and
    wherein the predetermined time is calculated by considering a probability that a shunt solution is pre-calculated and is evaluated by relative costs of a value of delaying a decision to make a shunt move compared with costs of having to re-plan a larger number of transporting device routes over a representative period of work.

5. The controller according to claim 4, wherein costs considered comprise at least one or more of:
    grid throughput in terms of orders per hour,
    operator productivity in terms of items picked per hour, and/or
    transporting device productivity in terms of orders per transporting device per hour.

6. The controller according to claim 4, wherein costs considered comprise at least one or more of:
    minimising a number of transporting devices for a required throughput, and/or
    minimising a number of operators for a required throughput.

7. The controller according to claim 4, wherein costs are determined using a Monte Carlo simulation over a predetermined time period.

8. The controller according to claim 7, wherein the Monte Carlo simulation is based on at least digital twin simulations including statistically sampled system factors including: more than one possible stock-holding scenarios including positioning of containers, quantities of stock keeping units, quantities of items of each stock keeping unit; and at least one of: possible ranges in variations in orders being picked including items and quantities, possible ranges in variations in orders being decanted, possible ranges in variations in pick-times and possible ranges in variations in decant-times; where the digital twin simulations are repeated many times with randomly selected values from the statistically varying parameters and the parameter value is determined to maximise one of: grid throughput in terms of orders per hour, operator productivity in terms of items picked per hour, or transporting device productivity in terms of orders per transporting device per hour; or minimise one of the number of transporting devices for a required throughput or the number of operators for a required throughput.

9. The controller according to claim 1, wherein each of the plurality of routes determined by the route determination unit includes a start time for each route.

10. The controller according to claim 9, wherein the start time for each route is less than a predetermined future maximum time.

11. A storage system in combination with a controller according to claim 1, the storage comprising:
  a first set of parallel rails or tracks extending in an X-direction, and a second set of parallel rails or tracks extending in a Y-direction transverse to the first set in a substantially horizontal plane to form a grid pattern including a plurality of grid spaces;
  a plurality of stacks of containers located beneath the rails, and arranged such that each stack is located within a footprint of a single grid space; and
  a plurality of transporting devices each arranged to selectively move in the X and/or Y directions, above the stacks on the rails and arranged to transport a container.

12. The storage system according to claim 11, wherein the at least one transporting device has a footprint that occupies only a single grid space in the storage system, such that a transporting device occupying one grid space does not obstruct a transporting device occupying or traversing adjacent grid spaces in the X and/or Y directions.

13. The storage system according to claim 11, comprising:
  a picking station arranged to receive a container transported by the at least one transporting device; and
  wherein the picking station is arranged for operation by an operator to pick items from one container to another container so as to form orders.

14. A method for controlling movement of a plurality of transporting devices, the method comprising:
  (1) determining a plurality of routes from one location on a grid-like structure to another location on the grid-like structure for a first transporting device;
  (2) generating at least one leg for each of the plurality of routes determined by the determining step;
  (3) calculating a shunt path for a second transporting device so as to shunt the second transporting device, wherein the shunt path is calculated at a predetermined time before which the second transporting device must commence movement to permit uninterrupted passage of the first transporting device;
  (4) providing clearance for the first transporting device to traverse a leg of a determined route; and
  (5) controlling the first transporting device to traverse the at least one leg of the determined route, wherein a portion of the at least one leg includes the uninterrupted passage.

15. The method according to claim 14, wherein the calculating step calculates the shunt path for the second transporting device at a predetermined time before the first transporting device reaches a current position of the second transporting device.

16. The method according to claim 14, wherein the calculating step calculates the shunt path for the second transporting device whilst the first transporting device is moving in a leg immediately before a leg in which the second transporting device is located.

17. The method according to claim 14, wherein the calculating step calculates the predetermined time before which the shunt path is calculated for the second transporting device; and
  wherein the predetermined time is calculated by considering a probability that a shunt solution is pre-calculated and is evaluated by relative costs of a value of delaying a decision to make a shunt move compared with costs of having to re-plan a larger number of transporting device routes over a representative period of work.

18. The method according to claim 17, wherein costs considered comprise at least one or more of:
  grid throughput in terms of orders per hour,
  operator productivity in terms of items picked per hour, and/or
  transporting device productivity in terms of orders per transporting device per hour.

19. The method according to claim 17, wherein costs considered comprise at least one or more of:
  minimising a number of transporting devices for a required throughput, and/or
  minimising a number of operators for a required throughput.

20. The method according to claim 17, comprising:
  determining costs using a Monte Carlo simulation over a predetermined time period.

21. The method according to claim 20, wherein the Monte Carlo simulation is based on at least digital twin simulations including statistically sampled system factors including: more than one possible stock-holding scenarios including positioning of containers, quantities of stock keeping units, quantities of items of each stock keeping unit; and at least one of: possible ranges in variations in orders being picked including items and quantities, possible ranges in variations in orders being decanted, possible ranges in variations in pick-times and possible ranges in variations in decant-times; where the digital twin simulations are repeated many times with randomly selected values from the statistically varying parameters and the parameter value is determined to maximise one of: grid throughput in terms of orders per hour, operator productivity in terms of items picked per hour, or transporting device productivity in terms of orders per transporting device per hour; or minimise one of the number of transporting devices for a required throughput or the number of operators for a required throughput.

22. The method according to claim 14, wherein each of the plurality of routes determined by the route determination unit includes a start time for each route.

23. The method according to claim 22, wherein the start time for each route is less than a predetermined future maximum time.

\* \* \* \* \*